(12) United States Patent
Tsai et al.

(10) Patent No.: US 10,783,527 B2
(45) Date of Patent: Sep. 22, 2020

(54) PROVIDING SEAMLESS ONLINE VIDEO ADVERTISEMENTS

(75) Inventors: Shawn Ching-Hsiang Tsai, Taipei (TW); Adam Chi-En Wang, Taipei (TW); Young Chung-Hau Yahg, Taipei (TW)

(73) Assignee: Oath Inc., New York, NY (US)

( * ) Notice: Subject to any disclaimer, the term of this patent is extended or adjusted under 35 U.S.C. 154(b) by 456 days.

(21) Appl. No.: 13/300,583

(22) Filed: Nov. 20, 2011

(65) Prior Publication Data

US 2013/0132211 A1 May 23, 2013

(51) Int. Cl.
*G06Q 30/02* (2012.01)
*H04N 21/81* (2011.01)
*H04N 21/4782* (2011.01)
*H04N 21/845* (2011.01)

(52) U.S. Cl.
CPC ......... *G06Q 30/02* (2013.01); *G06Q 30/0264* (2013.01); *G06Q 30/0272* (2013.01); *G06Q 30/0277* (2013.01); *H04N 21/812* (2013.01); *H04N 21/4782* (2013.01); *H04N 21/8455* (2013.01)

(58) Field of Classification Search
CPC ............................... G06Q 10/00; G06Q 30/02
USPC ............................ 705/14.1–14.73, 7.11–7.42
See application file for complete search history.

(56) References Cited

U.S. PATENT DOCUMENTS

| | | | | |
|---|---|---|---|---|
| 6,064,380 | A * | 5/2000 | Swenson et al. | 715/273 |
| 2003/0028565 | A1* | 2/2003 | Landsman et al. | 707/513 |
| 2008/0263583 | A1* | 10/2008 | Heath | 725/32 |
| 2008/0281689 | A1* | 11/2008 | Blinnikka et al. | 705/14 |
| 2009/0198787 | A1* | 8/2009 | Broda et al. | 709/209 |
| 2010/0031153 | A1* | 2/2010 | Ortwein et al. | 715/733 |
| 2011/0082755 | A1* | 4/2011 | Itzhak | 705/14.69 |
| 2011/0251902 | A1* | 10/2011 | Nagarajayya | G06Q 30/02 705/14.71 |
| 2011/0296293 | A1* | 12/2011 | Bhadury | G06F 17/30905 715/234 |
| 2012/0072272 | A1* | 3/2012 | Kilar et al. | 705/14.4 |
| 2012/0116897 | A1* | 5/2012 | Klinger et al. | 705/14.73 |
| 2012/0158527 | A1* | 6/2012 | Cannelongo et al. | 705/14.73 |

OTHER PUBLICATIONS

Krammer et al., An Effective Defence against Intrusive Web Advertising, Sixth Annual Conference on Privacy, Security and Trust—IEEE computer society, Oct. 2008, pp. 3-14 (Year: 2008).*

* cited by examiner

*Primary Examiner* — Robert D Rines
(74) *Attorney, Agent, or Firm* — Cooper Legal Group, LLC

(57) ABSTRACT

A computer-implemented method of providing seamless online video advertisements includes rendering a video advertisement on a first web page in a first tab. The computer-implemented method also includes recording current time of play constantly during the rendering of the video advertisement and receiving a request for a second web page in the first tab from the user. Further, the computer-implemented method includes unloading the first web page and loading the second web page in the first tab. Moreover, the computer-implemented method includes retrieving current time of play stored corresponding to the unloading and resume the rendering the video advertisement on the second web page based on the current time of play retrieved.

20 Claims, 7 Drawing Sheets

PROVIDING SEAMLESS ONLINE VIDEO ADVERTISEMENTS

TECHNICAL FIELD

Embodiments of the disclosure relate generally, to advertising techniques and more specifically, to provide a seamless online video advertisement during web browsing to a user.

BACKGROUND

Online advertising is a form of marketing that uses Internet to deliver messages to attract users during web browsing. Examples of the online advertising include, but are not limited to, contextual ads, banner ads and social network advertising. Online advertising has expanded to include video clips as advertisements. Typically, the video clips are viewed by a user as an entertainment and not as an advertisement. Moreover, the impact of a ten seconds video clip has better performance than the performance of static text and images.

However, the user behavior during web browsing is significantly different when compared to the user behavior while watching television channels. The user quickly views a web page to grasp certain needs and then clicks to view a different web page. The average time taken to view the web page is three to six seconds. In this scenario, the video clips are generally not completely delivered to the user, as the user keeps moving to different web pages. Consequently, the video clips are interrupted as the user clicks to view the different web page or even when the user clicks the refresh option. The scenario worsens when the user opens the same web page in different tabs or windows at different times. The same video clip would be played at different times in the different tabs. As a result, the user would run into an unpleasant experience as different video sounds are played. Subsequently, the video clip is not completely played.

In light of the foregoing discussion, there is a need for an efficient method and system for providing seamless online video advertisements to the user.

SUMMARY

The above-mentioned needs are met by a computer-implemented method, system, and computer program product for providing seamless online video advertisements.

An example of a computer-implemented method for providing seamless online video advertisements includes rendering a video advertisement on a first web page in a first tab. The computer-implemented method also includes recording current time of play constantly during the rendering of the video advertisement and receiving a request for a second web page in the first tab from the user. Further, the computer-implemented method includes unloading the first web page and loading the second web page in the first tab. Moreover, the computer-implemented method includes retrieving current time of play stored corresponding to the unloading and resume the rendering of the video advertisement on the second web page based on the current time of play retrieved.

An example of a computer program product stored on a non-transitory computer-readable medium that when executed by a processor, performs a method for providing seamless online video advertisements includes rendering a video advertisement on a first web page in a first tab. The computer program product also includes recording current time of play constantly during the rendering of the video advertisement and receiving a request for a second web page in the first tab from the user. Further, the computer program product includes unloading the first web page and loading the second web page in the first tab. Moreover, the computer program product includes retrieving current time of play stored corresponding to the unloading and resume the rendering of the video advertisement on the second web page based on the current time of play retrieved.

An example of a system for providing seamless online advertisements includes a web interface to display a video advertisement on a first web page in response to a user viewing a first web page in a first tab. The system also includes an ad server, communicatively coupled to the web interface, the ad server to store video advertisements and to render the video advertisements. Further, the system includes a timer, coupled in communication with the web interface, to constantly track current time of play during the rendering of the video advertisement. Moreover, the system includes a video player to render the video advertisement on the first web page.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

BRIEF DESCRIPTION OF THE FIGURES

In the following drawings like reference numbers are used to refer to like elements. Although the following figures depict various examples of the invention, the invention is not limited to the examples depicted in the figures.

DETAILED DESCRIPTION OF THE EMBODIMENTS

A computer-implemented method, system, and computer program product for providing seamless online video advertisements to a user is disclosed. The following detailed description is intended to provide example implementations to one of ordinary skill in the art, and is not intended to limit the invention to the explicit disclosure, as one or ordinary skill in the art will understand that variations can be substituted that are within the scope of the invention as described.

Figure 1:
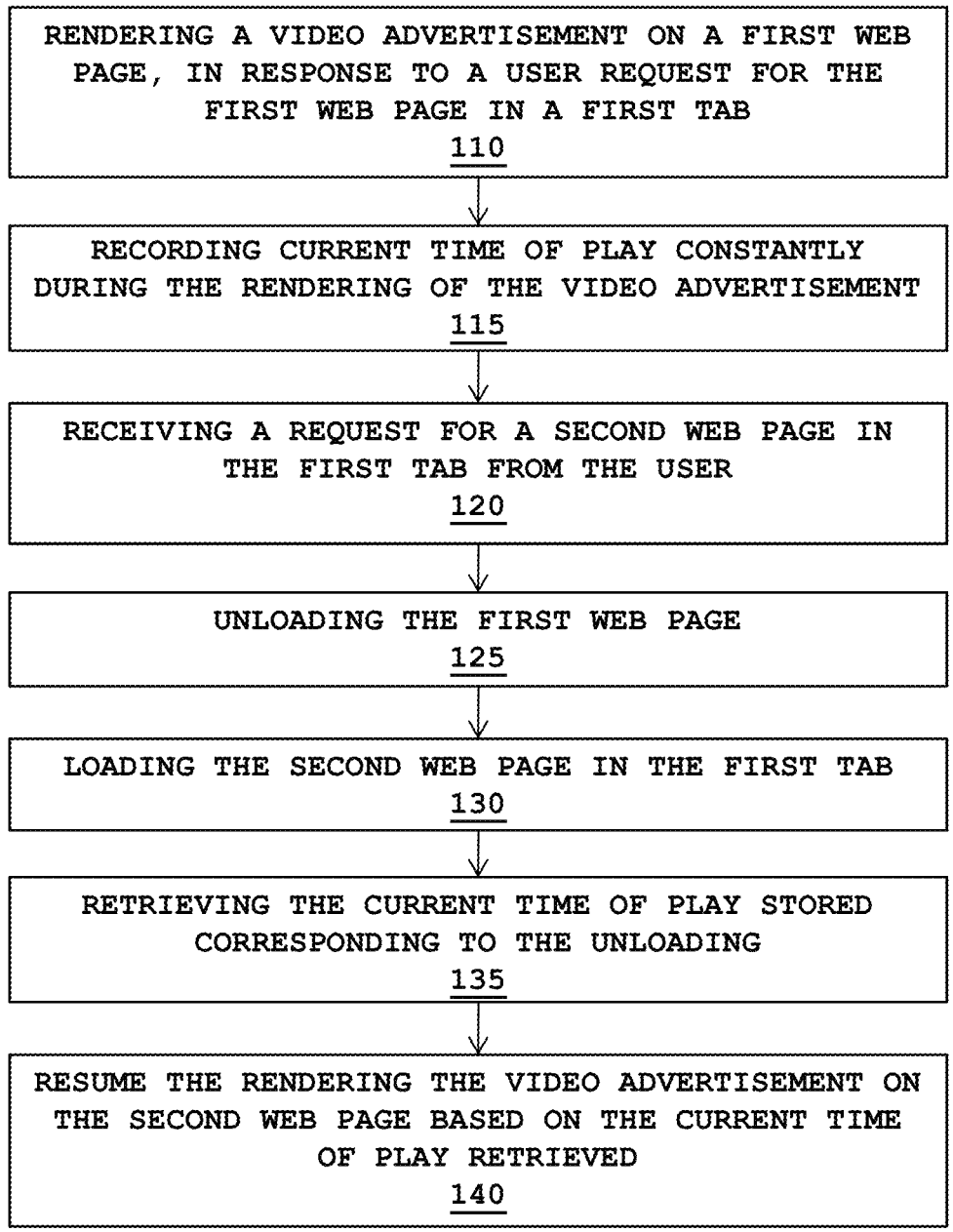
FIG. 1 is a flow diagram illustrating a method of providing seamless online video advertisements to a user, in accordance with one embodiment.

FIG. 1 is a flow diagram illustrating a method of providing seamless online video advertisements to a user, in accordance with one embodiment.

At step 110, a video advertisement is rendered on a first web page in response to a user request for the first web page in a first tab.

The user desires to browse Internet and requests to view a first web page by entering an appropriate URL (Uniform Resource Locator) in a web browser. The web browser can be a desktop web browser (for example, Internet Explorer, Mozilla, or Chrome), a mobile browser, or a web viewer built integrated into an application program. The first web page can include textual information, digital images, video and static advertisements, and other digital assets. Further, the first web page is loaded in the first tab for the user to view. Simultaneously, the video advertisement is also loaded. Typically, the video advertisement includes multiple moving pictures and text related to a specific product, for example, cars, electronic gadgets, resorts and so on, that are presented to the user.

As the first web page is loaded, the web browser connects to an ad server. In one embodiment, the web browser connects through a web socket defined in Hyper Text Markup Language 5 (HTML5). The ad server typically stores advertisements used in online marketing to deliver the advertisements to users.

Further, the first tab is assigned as a master tab.

The video advertisement is now rendered to the user.

At step 115, current time of play is constantly recorded during the rendering of the video advertisement.

As the video advertisement is rendered to the user, the current time of play is recorded until the first web page is unloaded.

In one embodiment, the web browser keeps loading new video advertisements when the video advertisement ends. The current time of play is then recorded for the new video advertisements.

At step 120, a request for a second web page in the first tab is received from the user.

Examples of the request includes, but is not limited to, clicking on a hyperlink in the first web page, entering a new URL, and refreshing the first page.

At step 125, the first web page is unloaded.

The first web page is closed and the current time of play at occurrence of unloading is stored.

At step 130, the second web page is loaded in the first tab.

The web browser connects to the ad server.

At step 135, the current time of play stored corresponding to the unloading is retrieved.

The web browser retrieves the current time of play stored during unloading of the first web page.

At step 140, rendering of the video advertisement on the second web page is resumed at the current time of play retrieved.

The video advertisement is rendered from the current time of play stored which signifies the time at which the video advertisement had been stopped when the first web page was unloaded.

The video advertisement is now played continuously between loading of the first web page and the second web page.

Figure 2:
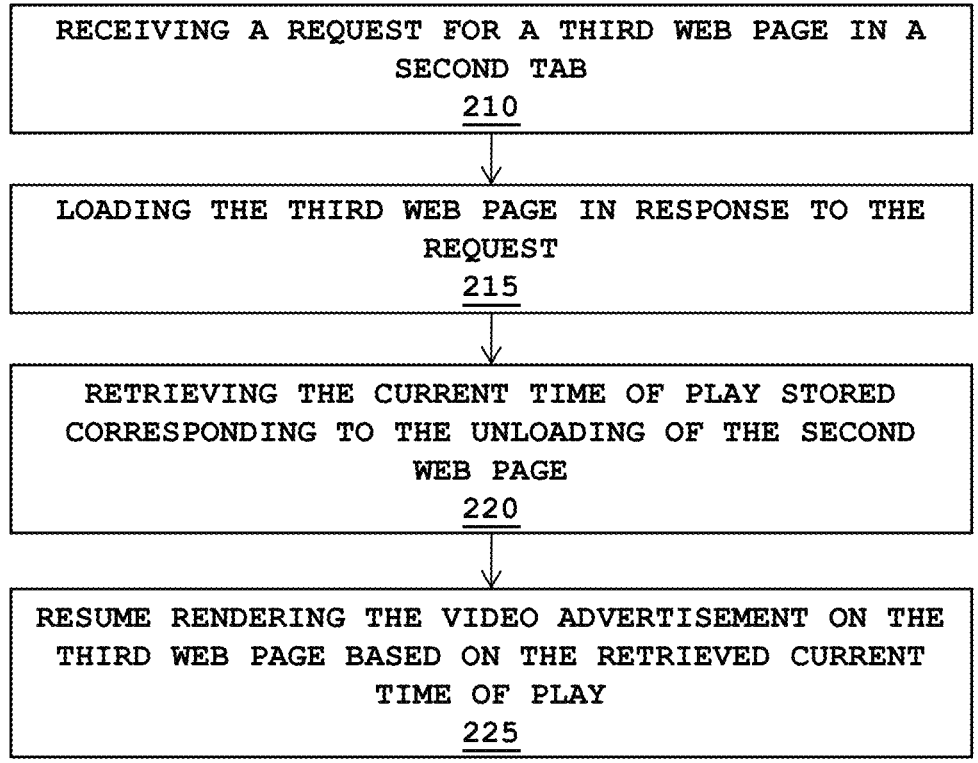
FIG. 2 is a flow diagram illustrating a method of providing seamless online video advertisements to a user, in accordance with another embodiment.

FIG. 2 is a flow diagram illustrating a method of providing seamless online video advertisements to a user, in accordance with another embodiment.

At step 210, a request for a third web page in a second tab is received.

Consider a scenario where the user has opened a first web page and a second web page in a first tab during browsing.

The user now opens the second tab and requests to view a third web page by entering an appropriate URL (Uniform Resource Locator) in the web browser.

At step 215, the third web page is loaded in response to the request.

The second web page in the first tab is unloaded and the current time of play is recorded.

As the third web page is loaded, the web browser connects to an ad server through a web socket defined in Hyper Text Markup Language 5(HTML5).

At this point, the second tab is selected as the master tab.

In one embodiment, if there are multiple tabs opened, the ad server selects any tab to be assigned as the master tab.

At step 220, the current time of play stored corresponding to the unloading of the second web page is retrieved.

The current time of play stored at the occurrence when the second web page is unloaded is retrieved. The current time of play signifies the time at which the video advertisement was last played.

At step 225, rendering the video advertisement on the third web page based on the retrieved current time of play is resumed.

The video advertisement is then resumed to play from the retrieved current time of play that signifies the time when the video advertisement was last played on the second web page.

Further, resuming play of the video advertisement allows synchronizing the video advertisement between the first tab and the second tab to render a seamless video advertisement to the user.

Figure 3:
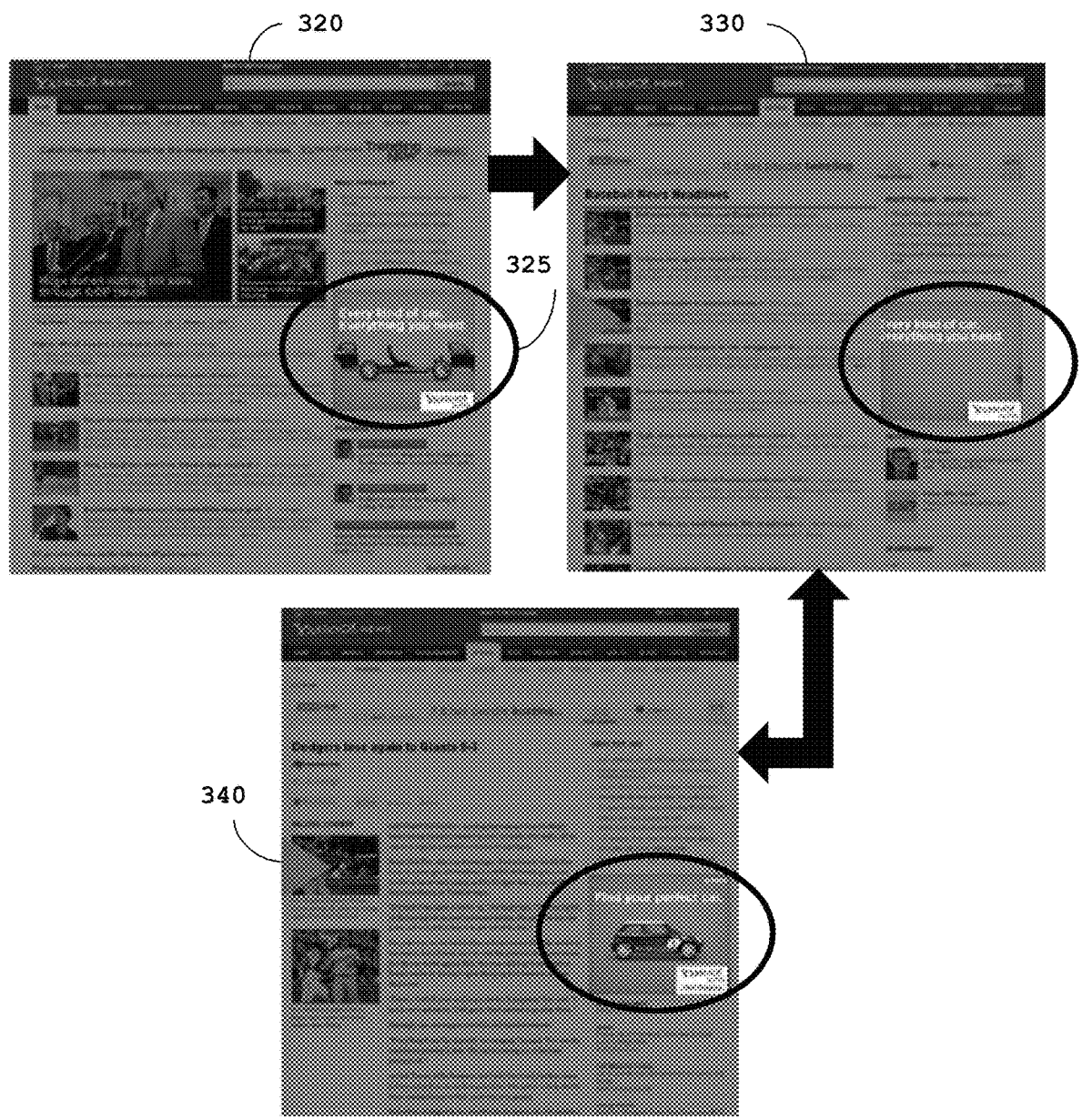
FIG. 3 is an exemplary representation of providing seamless online video advertisements, in accordance with one embodiment.

FIG. 3 is an exemplary representation of providing seamless online video advertisements, in accordance with one embodiment.

Consider a scenario where a user desires to browse Internet and opens a web page 320. The web page 320 includes text, images and a video advertisement 325. The video advertisement 325 begins to play when the web page 320 is loaded.

At this point, the user clicks on a hyperlink provided on the web page 320 to open an additional web page 330. As the web page 330 is loaded, the video advertisement 325 continues to play.

Similarly, a different web page 340 is opened and the video advertisement 325 continues to be played non-stop. Consequently, a seamless online video advertisement is played to the user.

Figure 4:
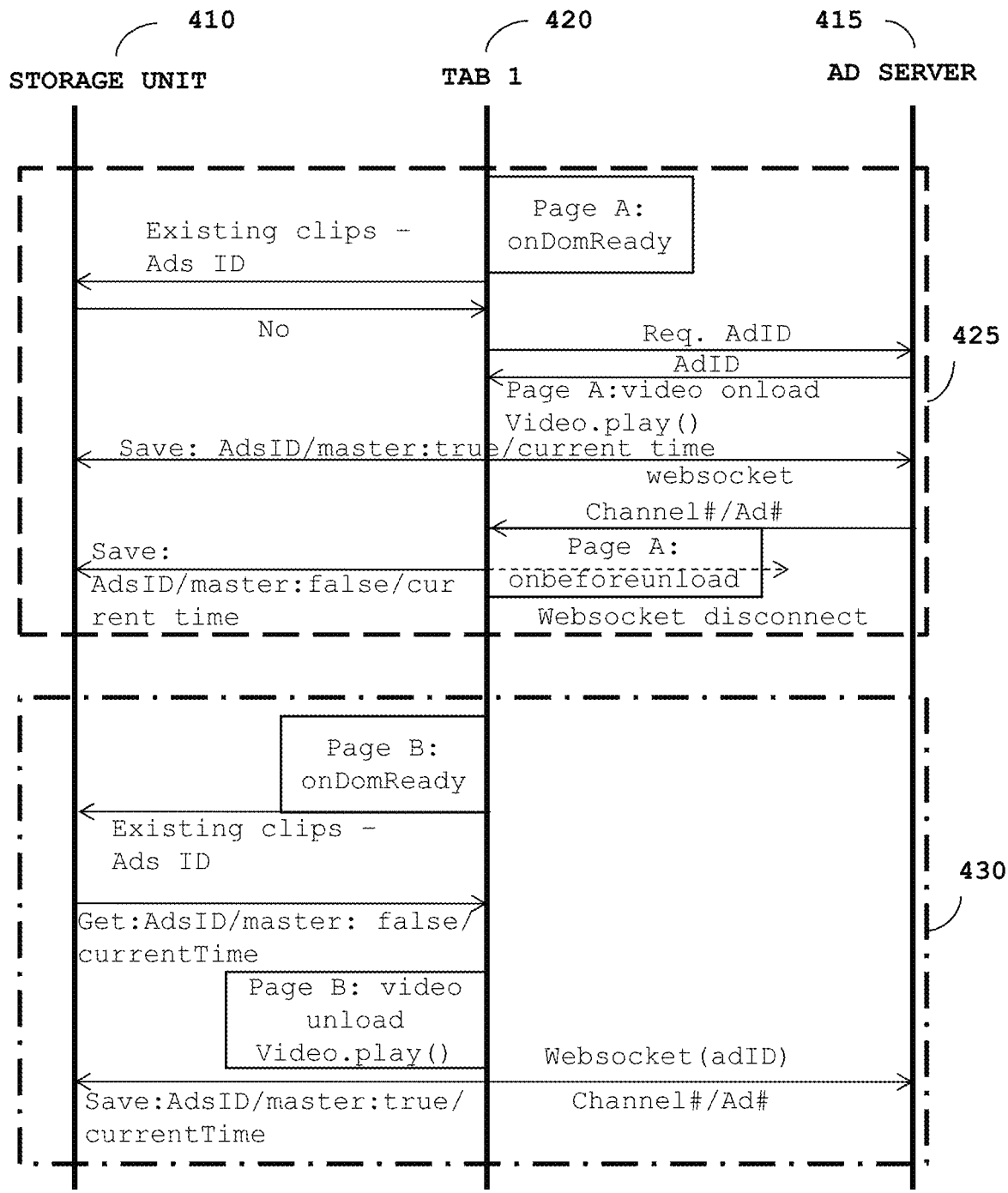
FIG. 4 is a flow diagram illustrating a method for providing seamless online video advertisements to a user in a single tab, in accordance with one embodiment.

FIG. 4 is a flow diagram illustrating a method for providing seamless online video advertisements to a user in a single tab, in accordance with one embodiment.

In the illustration of FIG. 4, a storage unit is represented by 410 and an ad server is represented by 415. Further, a web page is opened responsive to a user request in a Tab 1 represented by 420.

The storage unit typically stores the current time at which video advertisements are played and stopped. The ad server is a web server that stores online advertisements that are rendered to the user.

A user inputs a URL in the Tab 1 420 to view a specific web page, for example, Yahoo! Mail. Web page A is loaded on the Tab 1 420. Existing clips and advertisement identity (Ads ID) are checked in the storage unit 410. The storage unit sends a reply "No" to the Tab 1 420.

The Tab 1 420 then requests for a video advertisement to the ad server 415 by Advertisement Identity (AdID). The ad server 415 provides the AdID to the Tab 1 420. At this point of time the video advertisement is loaded on the web page in the Tab 1 420. The user can now view the video advertisement. Further, the Tab 1 420 is assigned as the master tab and the current time of play is recorded. A connection is also established between the Tab 1 420 and the ad server by a web socket defined in HTML5.

Simultaneously, a channel number or an Ad number is sent from the Ad server 415 to the Tab 1 420.

The user now desires to close the web page to open a new web page. As the web page is unloaded, the current time of play is stored in the storage unit 410. The Tab 1 420 is disabled as the master tab. Consequently, the websocket is disconnected.

The life cycle of web page A is represented as 425.

The user now desires to view a new web page, Page B, in the same tab. Page B is now loaded in the Tab 1. Existing clips and advertisement identity (Ads ID) are sent to the storage unit 410. The Tab 1 retrieves the current time of play when the Page A was unloaded from the storage unit 410. Consequently, the video advertisement is continued to be played from the retrieved current time of play. Further, Tab 1 is assigned as the master tab. A connection is also established between the Tab 1 420 and the ad server by websocket. Simultaneously, a channel number or an Ad number is also sent from the Tab 1 420 to the Ad server 415.

The life cycle of page B is represented as 430.

Figure 5:
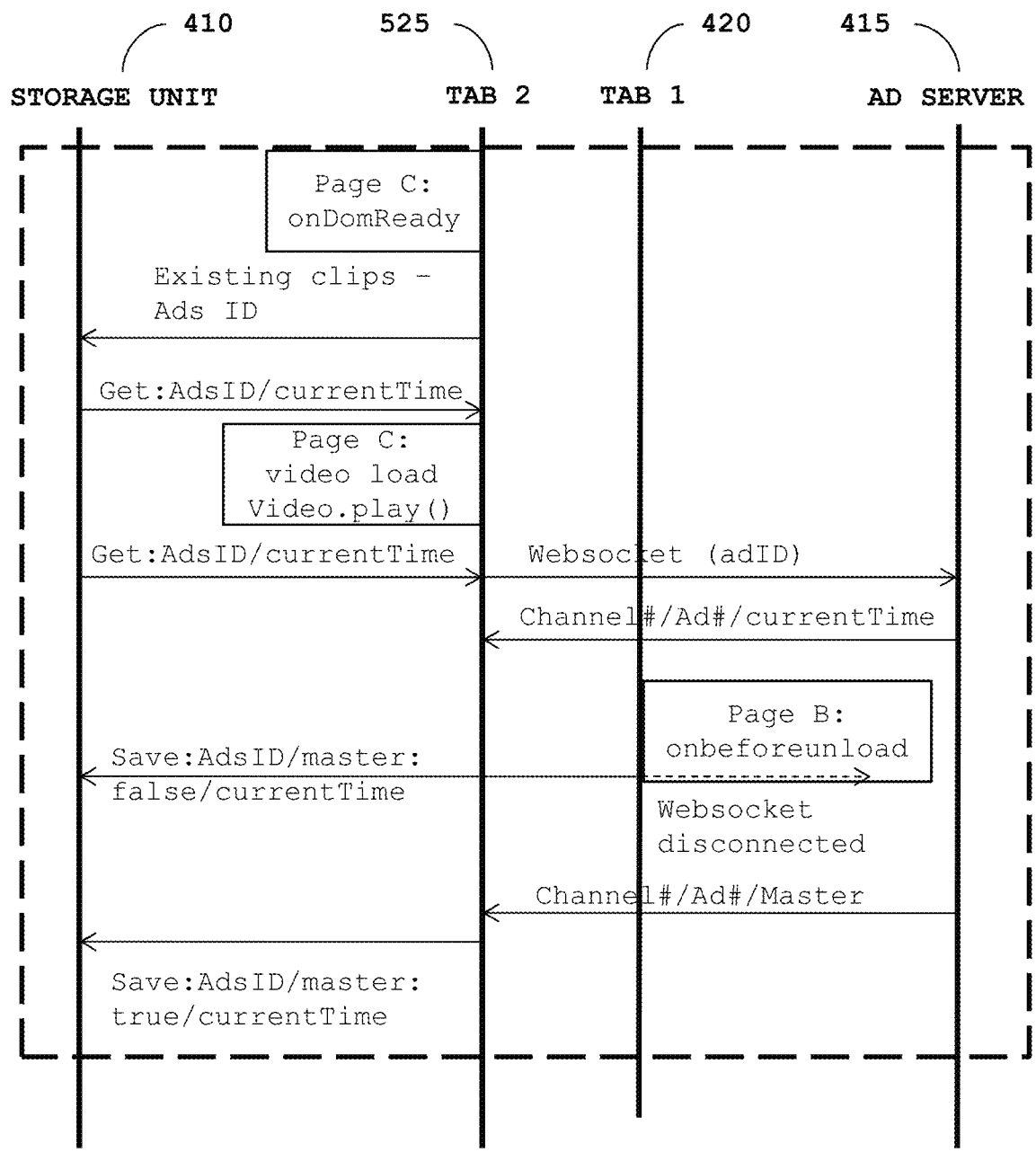
FIG. 5 is a flow diagram illustrating a method for providing seamless online video advertisements to a user between multiple tabs, in accordance with one embodiment.

FIG. 5 is a flow diagram illustrating a method for providing seamless online video advertisements to a user between multiple tabs, in accordance with one embodiment.

In the illustration of FIG. 5, the storage unit is represented by 410 and the ad server is represented by 415. Further, a web page is opened responsive to a user request in a Tab 1 and is represented by 420. Similarly, Tab 2 is also opened responsive to a user request and is represented by 525.

A user inputs a URL in the Tab 2 525 to view a specific web page, for example, Yahoo! Mail. Web page C is loaded on the Tab 2 525. Existing clips and advertisement identity (Ads ID) are retrieved from the storage unit 410. Tab 2 525 retrieves at least one of video advertisement identity (AdID) and the current time of play from the storage unit 410. The video advertisement is then played to the user.

A connection is established between Tab 2 525 and the ad server 415 by a websocket defined in HTML5. The ad server sends the channel number, advertisement number and the current time of play to Tab 2 525.

Further, Page B is unloaded and Tab 1 420 is disabled as the master tab. The current time of play at this point of unloading is recorded in the local storage 410. The connection between Tab 1 420 and the ad server 415 is disconnected with the websocket.

The channel number, advertisement number and the current time of play is sent from the ad server 415 to Tab 2 525. Tab 2 525 is then assigned as the master tab.

As a result, the video advertisement is synchronized and played between Tab 1 420 and Tab 2 525 allowing the user to view a nonstop seamless video advertisement.

Figure 6:
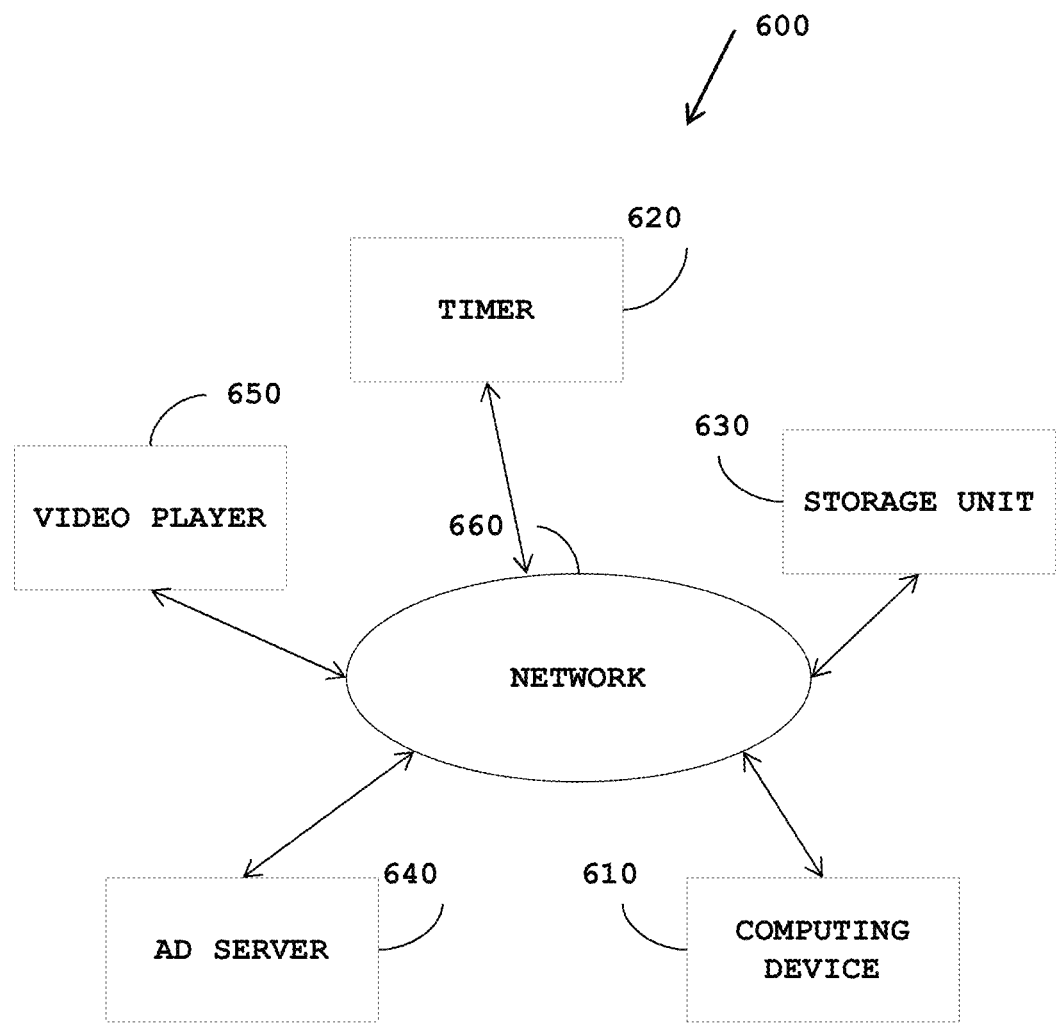
FIG. 6 is a block diagram illustrating a system for providing seamless online video advertisements to a user, in accordance with one embodiment.

FIG. 6 is a block diagram illustrating a system for providing seamless online video advertisements to a user, in accordance with one embodiment.

The system 600 can implement methods described above. The system 600 includes a computing device 610, a timer 620, a storage unit 630, an ad server 640, and a video player 650 in communication with a network 660 (for example, the Internet or a cellular network).

The computing device 610 can be, for example, a Personal Computer (PC), a stationary computing device, a laptop or notebook computer, a tablet computer, a smart phone or Personal Digital Assistant (PDA), a smart appliance, a video gaming console, an Internet television, a set-top box, or other suitable processor-based devices that can send and view online video advertisements. In one embodiment, the computing device 610 displays a seamless video advertisement. Additional embodiments of the computing device 610 are described in detail in conjunction with FIG. 7.

The timer 620 constantly tracks the current time of play during the rendering of video advertisements on a web page in response to the user viewing the web page. Specific times of unloading web pages are recorded and sent to the storage unit 630.

The storage unit 630, in one embodiment, stores the current time of play at the point of unloading a web page and interfaces with the ad server 640. The current time of play corresponds to the time at which the video advertisement was last played on the web page.

The ad server 640 selects the video advertisements and web pages that the user is interested in. The selected video advertisements are then rendered to the user.

Further, the computing device 610 receives a URL to view a specific web page. The URL is inputted by the user through a web interface. The web interface displays a video advertisement on the web page. At this point of time, the user can view the video advertisement and then click on a hyperlink to view a new web page. As the web page is loaded to the user, the current time of play at which the video advertisement was last played is retrieved from the storage unit 630. The web interface now resumes displaying the video advertisement in the new web page. Consequently, a seamless non-stop video advertisement is displayed to the user as the user views different web pages.

Further, the system 600 includes a video player 650. The video player 650 renders video advertisements to the user.

In some embodiments, the timer 620, the storage unit 630 and the video player 650 can be located in the computing device 610.

Figure 7:
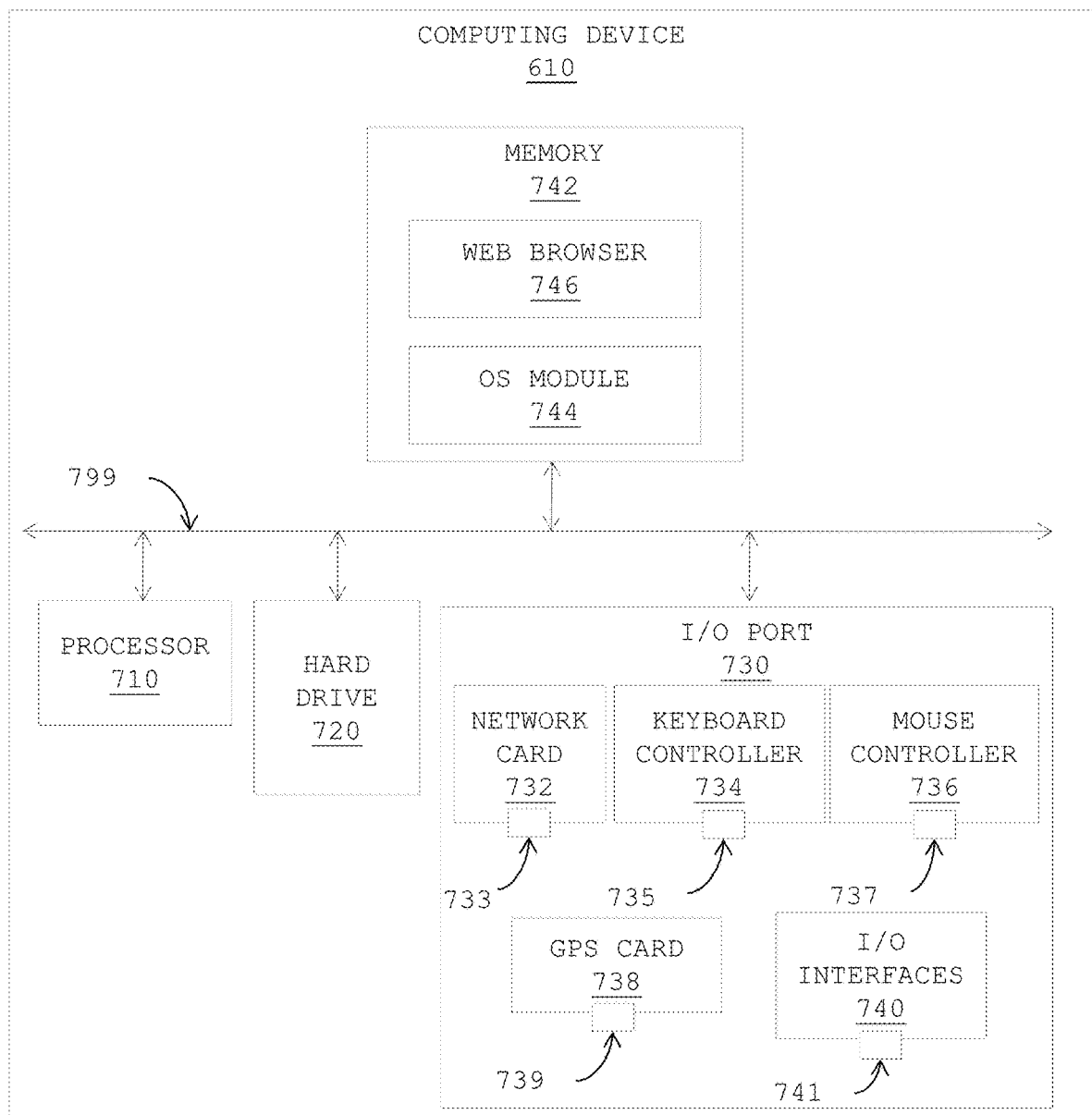
FIG. 7 is a block diagram illustrating an exemplary computing device, in accordance with one embodiment.

FIG. 7 is a block diagram illustrating an exemplary computing device, for example the computing device 610, in accordance with one embodiment.

The computing device 610 includes a processor 710, a hard drive 720, an I/O port 730, and a memory 742, coupled by a bus 799.

The bus 799 can be soldered to one or more motherboards. Examples of the processor 710 includes, but is not limited to, a general purpose processor, an application-specific integrated circuit (ASIC), an FPGA (Field Programmable Gate Array), a RISC (Reduced Instruction Set Controller) processor, or an integrated circuit. The processor 710 can be a single core or a multiple core processor. In one embodiment, the processor 710 is specially suited for processing demands of location-aware reminders (for example, custom micro-code, and instruction fetching, pipelining or cache sizes). The processor 710 can be disposed on silicon or any other suitable material. In operation, the processor 710 can receive and execute instructions and data stored in the memory 742 or the hard drive 720. The hard drive 720 can be a platter-based storage device, a flash drive, an external drive, a persistent memory device, or other types of memory.

The hard drive 720 provides persistent (long term) storage for instructions and data. The I/O port 730 is an input/output panel including a network card 732 with an interface 733 along with a keyboard controller 734, a mouse controller 736, a GPS card 738 and I/O interfaces 740. The network card 732 can be, for example, a wired networking card (for example, a USB card, or an IEEE 802.3 card), a wireless networking card (for example, an IEEE 802.11 card, or a Bluetooth card), and a cellular networking card (for example, a 3G card). The interface 733 is configured according to networking compatibility. For example, a wired networking card includes a physical port to plug in a cord, and a wireless networking card includes an antennae. The network card 732 provides access to a communication channel on a network. The keyboard controller 734 can be coupled to a physical port 735 (for example PS/2 or USB port) for connecting a keyboard. The keyboard can be a standard alphanumeric keyboard with 101 or 104 keys (including, but not limited to, alphabetic, numerical and punctuation keys, a space bar, modifier keys), a laptop or notebook keyboard, a thumb-sized keyboard, a virtual keyboard, or the like. The mouse controller 736 can also be coupled to a physical port 737 (for example, mouse or USB port). The GPS card 738 provides communication to GPS satellites operating in space to receive location data. An antenna 739 provides radio communications (or alternatively, a data port can receive location information from a peripheral device). The I/O interfaces 740 are user interfaces and are coupled to a physical port 741.

The memory 742 can be a RAM (Random Access Memory), a flash memory, a non-persistent memory device, or other devices capable of storing program instructions being executed. The memory 742 comprises an Operating System (OS) module 744 along with a web browser 746. In other embodiments, the memory 742 comprises a calendar application that manages a plurality of appointments. The OS module 744 can be one of Microsoft Windows® family of operating systems (for example, Windows 95, 98, Me, Windows NT, Windows 2000, Windows XP, Windows XP x64 Edition, Windows Vista, Windows CE, Windows Mobile), Linux, HP-UX, UNIX, Sun OS, Solaris, Mac OS X, Alpha OS, AIX, IRIX32, or IRIX64.

The web browser 746 can be a desktop web browser (for example, Internet Explorer, Mozilla, or Chrome), a mobile browser, or a web viewer built integrated into an application program. In an embodiment, a user access a system on the World Wide Web (WWW) through a network such as the Internet. The web browser 746 is used to download the web pages or other content in various formats including HTML, XML, text, PDF, and postscript, and may be used to upload information to other parts of the system. The web browser may use URLs (Uniform Resource Locators) to identify resources on the web and HTTP (Hypertext Transfer Protocol) in transferring files to the web.

As described herein, computer software products can be written in any of various suitable programming languages, such as C, C++, C#, Pascal, Fortran, Perl, Matlab (from MathWorks), SAS, SPSS, JavaScript, AJAX, and Java. The computer software product can be an independent application with data input and data display modules. Alternatively, the computer software products can be classes that can be instantiated as distributed objects. The computer software products can also be component software, for example Java Beans (from Sun Microsystems) or Enterprise Java Beans (EJB from Sun Microsystems). Many functionalities described herein can be implemented in computer software, computer hardware, or a combination.

Furthermore, a computer that is running the previously mentioned computer software can be connected to a network and can interface to other computers using the network. The network can be an intranet, internet, or the Internet, among others. The network can be a wired network (for example, using copper), telephone network, packet network, an optical network (for example, using optical fiber), or a wireless network, or a combination of such networks. For example, data and other information can be passed between the computer and components (or steps) of a system using a wireless network based on a protocol, for example Wi-Fi (IEEE standards 802.11, 802.11a, 802.11b, 802.11e, 802.11g, 802.11i, and 802.11n). In one example, signals from the computer can be transferred, at least in part, wirelessly to components or other computers.

Advantageously, a seamless non-stop video advertisement is rendered to a user between different web pages during web browsing. As a result, the user can view the entire video advertisement without interruption. This results in increased Clickthrough Rates (CTRs) for the advertisements.

It is to be understood that although various components are illustrated herein as separate entities, each illustrated component represents a collection of functionalities which can be implemented as software, hardware, firmware or any combination of these. Where a component is implemented as software, it can be implemented as a standalone program, but can also be implemented in other ways, for example as part of a larger program, as a plurality of separate programs, as a kernel loadable module, as one or more device drivers or as one or more statically or dynamically linked libraries.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies and other aspects are not mandatory or significant, and the mechanisms that implement the invention or its features may have different names, divisions and/or formats.

Furthermore, as will be apparent to one of ordinary skill in the relevant art, the portions, modules, agents, managers, components, functions, procedures, actions, layers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment.

Furthermore, it will be readily apparent to those of ordinary skill in the relevant art that where the present invention is implemented in whole or in part in software, the software components thereof can be stored on computer readable media as computer program products. Any form of computer readable medium can be used in this context, such as magnetic or optical storage media. Additionally, software portions of the present invention can be instantiated (for example as object code or executable images) within the memory of any programmable computing device.

Accordingly, the disclosure of the present invention is intended to be illustrative, but not limiting, of the scope of the invention, which is set forth in the following claims.

What is claimed is:

1. A computer-implemented method for providing seamless playing of online video advertisements, the computer-implemented method comprising:
rendering, by a computer, a video advertisement on a first web page displaying on a first tab of a browser;
sending, by a computer, at least one of a channel number or an advertisement number to the first tab;
receiving, by a computer, in the first tab, a request from a user to send a second web page to the first tab;
recording, by a computer, a progress in a playing of the video advertisement, the progress being as of an unloading of the first web page from the first tab upon receiving the request from the user;
sending, by a computer, the second web page to the first tab;
retrieving, by a computer, the progress as of the unloading in the playing of the video advertisement;
rendering, by a computer, the video advertisement on the second web page displaying on the first tab, based on the retrieved progress as of the unloading in the playing of the video advertisement, so that after the unloading, rendering of the video advertisement on the first tab continues, without interruption, on the second web page displaying on the first tab;
receiving, by a computer, at least one of the channel number or the advertisement number from the first tab;
receiving, by a computer, in a second tab of the browser, a request from the user to send a third web page to the second tab, wherein the third web page is of a same website as the first web page; and
in response to the request from the user to send the third web page to the second tab, transferring, by a computer, rendering of the video advertisement to the second tab, so that rendering of the video advertisement continues, without interruption, on the third web page displaying on the second tab.

2. The computer-implemented method of claim 1, wherein the rendering of the video advertisement on the first web page displaying on the first tab comprises:
receiving a request for the first web page from the user; and
loading the first web page.

3. The computer-implemented method of claim 2, wherein the loading comprises: connecting to an ad server, and the browser comprises a browser of a mobile device.

4. The computer-implemented method of claim 1, further comprising:
in response to the request from the user to send the third web page to the second tab, unloading the second web page; and
storing a second progress as of the unloading of the second web page in the playing of the video advertisement.

5. The computer-implemented method of claim 4, further comprising:
loading the third web page in response to the request from the user to send the third web page to the second tab; and
retrieving a current time of play stored corresponding to the second progress as of the unloading of the second web page;
wherein the rendering of the video advertisement on the third web page displaying on the second tab is based on the retrieved current time of play.

6. The computer-implemented method of claim 5, further comprising:
storing the first tab as a master tab in response to the request from the user to send the second web page to the first tab; and
selecting the second tab as the master tab in response to the request from the user to send the third web page to the second tab.

7. The computer-implemented method of claim 5, wherein:
the transferring of the rendering of the video advertisement to the second tab comprises synchronizing the video advertisement between the first tab and the second tab to render a seamless video advertisement to the user.

8. The computer-implemented method of claim 1, wherein:
the sending at least one of the channel number or the advertisement number to the first tab comprises sending the channel number to the first tab; and
the receiving at least one of the channel number or the advertisement number from the first tab comprises receiving the channel number from the first tab.

9. The computer-implemented method of claim 1, further comprising:
establishing, in association with loading the first web page, a first websocket connection between the first tab and a computer;
disconnecting, in association with the unloading of the first web page, the first websocket connection; and
establishing, in association with loading the second web page, a second websocket connection between the first tab and the computer.

10. A non-transitory computer-readable medium, comprising a computer program for providing seamless playing of online video advertisements, that when executed by a processor, directs a computer processor to perform the functions of:
rendering a video advertisement on a first web page displaying on a first tab of a browser;
sending at least one of a channel number or an advertisement number to the first tab;
receiving, in the first tab, a request from a user to send a second web page to the first tab;
recording a progress in a playing of the video advertisement, the progress being as of an unloading of the first web page from the first tab upon receiving the request from the user;
sending the second web page to the first tab;
retrieving the progress as of the unloading in the playing of the video advertisement;
rendering the video advertisement on the second web page displaying on the first tab, based on the retrieved progress as of the unloading in the playing of the video advertisement, so that after the unloading, rendering of the video advertisement on the first tab continues, without interruption, on the second web page displaying on the first tab;
receiving at least one of the channel number or the advertisement number from the first tab;
receiving, in a second tab of the browser, a request from the user to send a third web page to the second tab, wherein the third web page is of a same website as the first web page; and in response to the request from the user to send the third web page to the second tab of the browser, transferring rendering of the video advertisement to the second tab, so that rendering of the video advertisement continues, without interruption, on the third web page displaying on the second tab.

11. The computer-readable medium of claim 10, wherein the rendering of the video advertisement on the first web page displaying on the first tab comprises:
receiving a request for the first web page from a user; and loading the first web page.

12. The computer-readable medium of claim 10, wherein the computer program is further configured to, when executed by the processor, cause the processor to perform the functions of:
in response to the request from the user to send the third web page to the second tab, unloading the second web page; and
storing a second progress as of the unloading of the second web page in the playing of the video advertisement.

13. The computer-readable medium of claim 12, wherein the computer program is further configured to, when executed by the processor, cause the processor to perform the functions of:
loading the third web page in response to the request from the user to send the third web page to the second tab; and
retrieving a current time of play stored corresponding to the second progress as of the unloading of the second web page;
wherein the rendering of the video advertisement on the third web page displaying on the second tab is based on the retrieved current time of play.

14. The computer-readable medium of claim 12, wherein the computer program is further configured to, when executed by the processor, cause the processor to perform the functions of:
storing the first tab as a master tab in response to the request from the user to send the second web page to the first tab; and
selecting the second tab as the master tab in response to the request from the user to send the third web page to the second tab.

15. The computer-readable medium of claim 12, wherein:
the transferring of the rendering of the video advertisement to the second tab comprises synchronizing the video advertisement between the first tab and the second tab to render a seamless video advertisement to the user.

16. The computer-readable medium of claim 10, wherein the computer program is further configured to, when executed by the processor, cause the processor to perform the functions of:
establishing, in association with loading the first web page, a first websocket connection between the first tab and a computer;
disconnecting, in association with the unloading of the first web page, the first websocket connection; and
establishing, in association with loading the second webpage, a second websocket connection between the first tab and the computer.

17. A system for providing seamless online video advertisements, the system comprising:
a processor-readable storage medium comprising a computer program for providing seamless playing of online video advertisements; and
a processor, when executing the computer program, configured to:
render a video advertisement on a first web page in a first tab of a browser;
send at least one of a channel number or an advertisement number to the first tab;
receive, in the first tab, a request from a user to send a second web page to the first tab;
record a progress in a playing of the video advertisement, the progress being as of an unloading of the first web page from the first tab upon receiving the request from the user;
send the second web page to the first tab;
retrieve the progress as of the unloading in the playing of the video advertisement;
render the video advertisement on the second web page displaying in the first tab, based on the retrieved progress as of the unloading in the playing of the video advertisement, so that after the unloading, rendering of the video advertisement on the first tab continues, without interruption, on the second web page in the first tab;
receive at least one of the channel number or the advertisement number from the first tab;
receive, in a second tab of the browser, a request from the user to send a third web page to the second tab, wherein the third web page is of a same website as the first web page; and
in response to the request from the user to send the third web page to the second tab, transfer rendering of the video advertisement to the second tab, so that rendering of the video advertisement continues, without interruption, on the third web page displaying on the second tab.

18. The system of claim 17, wherein the processor is further configured to, when executing the computer program:
establish, in association with loading the first web page, a first websocket connection between the first tab and a computer;
disconnect, in association with the unloading of the first web page, the first websocket connection; and
establish, in association with loading the second webpage, a second websocket connection between the first tab and the computer.

19. The system of claim 17, wherein the processor is further configured to, when executing the computer program:
in response to the request from the user to send the third web page to the second tab, unload the second web page; and
store a second progress as of the unloading of the second web page in the playing of the video advertisement.

20. The system of claim 19, wherein the processor is further configured to, when executing the computer program:
load the third web page in response to the request from the user to send the third web page to the second tab; and
retrieve a current time of play stored corresponding to the second progress as of the unloading of the second web page;
wherein the rendering the video advertisement on the third web page displaying on the second tab is based on the retrieved current time of play.

* * * * *